3,649,604
NOVEL METHOD FOR POLYMERIZING VINYL
COMPOUNDS IN THE PRESENCE OF IMID-
AZOLE AND A CARBON TETRAHALIDE
Minoru Imoto, 3-46 Okashimachi, Hirakatsshi, Osakafu,
Japan; Kiichi Takemoto, 3-32 Sumie Nishi, Sumiyo-
shiku, Osakafu, Japan; and Heiichi Azuma, 11 Sanjo
Minamimachi, Ashiyashi, Hyogoken, Japan
No Drawing. Continuation-in-part of application Ser. No.
701,050, Jan. 29, 1968. This application Sept. 1, 1970,
Ser. No. 68,767
Int. Cl. C08f 3/12, 3/76, 3/64
U.S. Cl. 260—80         3 Claims

ABSTRACT OF THE DISCLOSURE

Method for polymerizing vinyl compound in the presence of an imidazole and a carbon tetrahalide or in the presence of the same accompanied with a high molecular weight substance or the same accompanied with a high molecular weight substance and water. No other catalytic components including sulfur dioxide are needed.

This application is a continuation-in-part of copending application Ser. No. 701,050, filed Jan. 29, 1968, and now abandoned.

BACKGROUND

The polymerization of vinyl compounds in the presence of carbon tetrahalide, particularly carbon tetrachloride, is found, in "High Polymers, Japan" vol. 15, p. 964 (1966). For instance, it is known that, N-vinyl carbazol polymerizes in the presence of carbon tetrachloride; but this polymerization is inhibited by the presence of water and copolymerization with methyl methacrylate hardly occurs.

Furthermore, it is found in the Journal of Polymer Science, vol. 4, pp. 815–820 that the polymerization of methyl methacrylate is initiated by a solution of liquid sulfur dioxide—electron donor—carbon tetrachloride. As the electron donor, alkyl derivatives of the imidazole are illustrated.

BRIEF SUMMARY OF THE INVENTION

It has now been found that the polymerization of vinyl compounds proceeds smoothly in the presence of an imidazole and a carbon tetrahalide.

It is also found that the presence of a high molecular weight substance and/or the presence of water promote the reaction. This reaction has several characteristic features clearly distinguishable from the prior arts. One of the features, compared with the above mentioned first prior art, is that this reaction can be applied widely to general homopolymerization and copolymerization reactions of vinyl compounds. Another is that a polymer can be obtained with hardly any accompanying graft polymerization, even in the presence of a high molecular weight substance; and when a compound of high molecular weight is present, the presence of water in the reaction system is actually preferred. Still another characteristic feature is that the reaction is not accompanied by side reactions or the formation of colored impurities.

Further, in the above mentioned second prior art, the electron donor forms a complex with sulfur dioxide, the sulfur dioxide acting as the electron acceptor. It is clearly set forth that no polymer can be obtained if the complex is deficient. This shows that sulfur dioxide is an indispensable component in this catalytic system. It is an important feature of the present invention distinguishable from the above mentioned second prior art, that the indispensable components of the present invention are imidazole and $CCl_4$ (or $CBr_4$), and that sulfur dioxide is not used at all.

DETAILED DESCRIPTION

Imidazoles useful in the present invention, include imidazole itself and its derivatives. Representative imidazole derivatives include its substitutes having one or more alkyl, aryl or similar groups.

Among carbon tetrahalides, carbon tetrachloride is most highly preferable and carbon tetrabromide also is useful.

The preferred range of the molar proportion of imidazole to carbon tetrahalide is 0.1:1 to 0.2:1.

Vinyl compounds which may be polymerized according to the present invention include acrylonitrile, methyl methacrylate, methyl acrylate, styrene, acrylic acid, methacrylic acid and the like.

The polymerization reactions of the present invention can be applied not only to the homopolymerization of vinyl compounds but also their copolymerization.

If pyridine, 4-methyl pyrimidine or the like is used instead of imidazole, the polymerization of the vinyl compound still occurs but the polymerization rate is extremely low by comparison with the use of an imidazole.

Since the result of the copolymerization of acrylonitrile and styrene given in Table 2 hereinafter, agrees with the composition curve for monomers and copolymers obtained in the radical polymerization (Journal of the American Chemical Society 69, p. 1903), the polymerization of vinyl compounds carried out in the presence of imidazoles and carbon tetrahalide is also thought to proceed by a free radical polymerization mechanism. This hypothesis is supported by the fact that the presence of hydroquinone in the reaction system substantially inhibits the reaction. However, in spite of the supposed radical mechanism, the molecular weight of the resultant polymer can be extremely high.

If a high molecular weight substance is added and further water is added to the reactants, the polymerization rate is increased remarkably.

The high molecular weight substance may be naturally occurring or synthetic. Examples are cellulose, silk, polymethyl methacrylate, polyvinyl chloride, polysteyrene, poly-4-vinyl pyridine, poly-5-ethyl-2-vinyl pyridine, polyvinylalcohol and the like.

The amounts of the high molecular weight substance and water per ml. of the carbon tetrahalide are usually 0.05 to 0.2 g. and 0.5 to 5 ml. respectively, but these ranges are not severe.

In the case of the addition of the high molecular weight substance to the reactants, the product is mainly a homopolymer or a copolymer of a vinyl compound used and graft copolymer of the vinyl compound onto the high molecular weight substance is practically absent from the product. Even when some of the graft copolymer is found in the product of the reaction, the polymer of the vinyl compound can be separated from it by solvent extraction.

The reaction is preferably carried out at a temperature of about 70 to 90° C., and may be in the presence or absence of an inert hydrocarbon solvent such as benzene, toluene or the like.

The product of the invention is useful for manufacturing shaped articles.

Following examples are illustrative of the process of the present invention and all percentages herein are by weight unless otherwise specified.

EXAMPLE 1

Imidazole is recrystallized from acetone three times (M.P. 88–89° C.), and carbon tetrachloride is washed with an aqueous 5% solution of sodium hydroxide, then with water, dried over potassium carbonate and distilled through a column filled with active alumina, under an atmosphere of nitrogen and in the dark, in order to purify them for use in the invention.

The polymerization reaction is carried out in a sealed tube fitted with a light shutter, in the absence of atmospheric oxygen. The vinyl compounds listed in Table 1 are introduced into the tube, together with a mixture of 0.08 g. of imidazole, 1.0 ml. of carbon tetrachloride and 4 ml. of benzene. As the reaction progresses, the product precipitates out and the content of the sealed tube becomes a turbid white. After the reaction has continued for 4 hours, the reaction product is poured into an excess of methanol. After filtration, the reaction product is purified by recrystallization from a suitable solvent (e.g. dimethyl formamide-methanol mixture in the case of polyacrylonitrile). The results obtained are shown in Table 1.

TABLE 1

| No. | Vinyl compound | The amount used, g. | Temperature, °C. | Total polymerization percent | Molecular weight of polymers |
|---|---|---|---|---|---|
| 1 | Acrylonitrile | 4.03 | 80 | 3.6 | 7.2×10⁵ |
| 2 | do | 4.03 | 85 | 7.9 | |
| 3 | do | 4.03 | 85 | 3.9 | |
| 4 | Methyl methyacrylate | 4.68 | 80 | 1.5 | 22.0×10⁵ |
| 5 | Styrene | 4.53 | 80 | 4.6 | 3.5×10⁴ |
| 6 | Acrylonitrile | 4.00 | 85 | 8.8 | |
| 7 | Methyl acrylate | 4.75 | 80 | 3.7 | |
| 8 | Acrylic acid | 5.25 | 80 | 6.6 | |
| 9 | Methacrylic acid | 5.07 | 80 | 3.5 | |

In case of No. 3, 0.0382 g. of hydroquinone is included in the reaction system. No. 6 is the result obtained by using 5.0 ml. of carbon tetrachloride and without using benzene. If either imidazole or carbon tetrachloride is not present, the polymerization reaction does not take place.

EXAMPLE 2

The copolymerization of acrylonitrile and styrene is carried out according to the method of Example 1. The results obtained are shown in Table 2. 1.0 ml. of carbon tetrachloride is used and the reaction is carried out for 4 hours at a temperature of 85° C.

TABLE 2

| No. | Imidazole (g.) | Acrylonitrile (g.) | Styrene (g.) | Benzene (ml.) | Total polymerization | N (percent) | Mol ratio of acrylonitrile to styrene |
|---|---|---|---|---|---|---|---|
| 1 | 0.0798 | 2.42 | 2.72 | 3.0 | 8.8 | 7.92 | 0.84 |
| 2 | 0.0831 | 1.61 | 1.81 | 5.0 | 6.5 | 8.03 | 0.86 |
| 3 | 0.0838 | 2.42 | 0.91 | 4.0 | 6.2 | 10.06 | 1.21 |

EXAMPLE 3

In this example, the polymerization of acrylonitrile is carried out by using various high molecular weight substances. 0.08 g. of imidazole, 1.0 ml. of carbon tetrachloride, 0.1 g. of the high molecular weight substance and 4.03 g. of acrylonitrile are used. The result obtained is shown in Table 3.

TABLE 3

| No. | High molecular weight substance | Total polymerization percent | Molecular weight of polyacrylonitrile |
|---|---|---|---|
| 1 | None | 3.6 | 7.25×10⁵ |
| 2 | Cellulose | 13.1 | 5.79 |
| 3 | Cellulose plus water (2 ml.) | 23.0 | 9.51 |
| 4 | Silk | 8.6 | 6.40 |
| 5 | Polymethyl methacrylate | 11.5 | 6.09 |
| 6 | Polyvinyl chloride | 5.9 | 4.76 |
| 7 | Polystyrene | 4.5 | 4.76 |
| 8 | Poly-4-vinyl pyridine | 14.3 | 6.05 |
| 9 | Poly-5-ethyl-2-vinyl pyridine | 28.5 | 5.00 |
| 10 | Polyvinyl alcohol ($\overline{P}_n$=1,700) | 7.2 | 8.00 |

The above-mentioned results show that the presence of a high molecular weight substance and the additional presence of water in the reaction system considerably promotes the reaction. The resultant product is almost entirely a homopolymer of vinyl compound used.

What is claimed is:

1. A method for polymerizing a vinyl compound selected from the group consisting of acrylonitrile, methyl methacrylate, methyl acrylate, acrylic acid, methacrylic acid and styrene which comprises polymerizing said vinyl compound in the presence of a catalyst consisting of imidazole and a carbon tetrahalide selected from the group consisting of carbon tetrachloride and carbon tetrabromide in a molar proportion of imidazole to carbon tetrahalide of from 0.1:1 to 0.2:1, at a temperature from 70° to 90° C.

2. A method according to claim 1 wherein a high molecular weight material selected from the group consisting of cellulose, silk, polymethylmethacrylate, polyvinyl chloride, polystyrene, poly-4-vinyl pyridine, poly-5-ethyl-2-vinyl pyridine, and polyvinyl alcohol is also present as a promoter during the polymerization.

3. A method according to claim 2 wherein water is also present as a promoter during the polymerization.

References Cited

UNITED STATES PATENTS 2,528,469  10/1950  Condo et al. _____ 260—8

OTHER REFERENCES

Matsuda et al., J. Pol. Sci., vol. 4 (part B), pp. 815–820 (1966).

HARRY WONG, Jr., Primary Examiner

U.S. Cl. X.R.

260—32.6, 80.3, 85.5, 86.1, 88.1, 88.3, 88.7, 89.5, 93.5